US009411331B2

(12) United States Patent
Mitani et al.

(10) Patent No.: US 9,411,331 B2
(45) Date of Patent: Aug. 9, 2016

(54) AUTOMATIC PROGRAMMING DEVICE AND METHOD

(71) Applicants: Yuka Mitani, Tokyo (JP); Kenji Iriguchi, Tokyo (JP); Sanae Chiba, Tokyo (JP); Yuji Fujimoto, Aichi (JP)

(72) Inventors: Yuka Mitani, Tokyo (JP); Kenji Iriguchi, Tokyo (JP); Sanae Chiba, Tokyo (JP); Yuji Fujimoto, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/421,311

(22) PCT Filed: Oct. 31, 2012

(86) PCT No.: PCT/JP2012/078223
§ 371 (c)(1),
(2) Date: Feb. 12, 2015

(87) PCT Pub. No.: WO2014/068715
PCT Pub. Date: May 8, 2014

(65) Prior Publication Data
US 2015/0220079 A1 Aug. 6, 2015

(51) Int. Cl.
*G06F 19/00* (2011.01)
*G05B 19/4093* (2006.01)

(52) U.S. Cl.
CPC ...... *G05B 19/40937* (2013.01); *G05B 2219/34088* (2013.01); *G05B 2219/35318* (2013.01);
(Continued)

(58) Field of Classification Search
CPC .............. G05B 19/40937; G05B 2219/35318; G05B 2219/35333; G05B 2219/35341; G05B 2219/34088; G05B 2219/45162; Y02P 90/265
See application file for complete search history.

(56) References Cited

U.S. PATENT DOCUMENTS 5,249,135 A * 9/1993 Fujita ............... G05B 19/40937
700/179
5,293,321 A * 3/1994 Fujita ............... G05B 19/40935
700/182
(Continued)

FOREIGN PATENT DOCUMENTS

CN 102473009 A 5/2012
JP 06-210544 A 8/1994
(Continued)

OTHER PUBLICATIONS

Kaymakci, M., Z. M. Kilic, and Y. Altintas. "Unified cutting force model for turning, boring, drilling and milling operations." International Journal of Machine Tools and Manufacture 54 (2012): 34-45.*
(Continued)

*Primary Examiner* — Michael D Masinick
(74) *Attorney, Agent, or Firm* — Sughrue Mion, PLLC

(57) ABSTRACT

An automatic programming device includes: a machining-area-shape generation unit that generates machining-area shape data that is a machining area shape machined on the basis of machining-area data; and a chamfering tool-path generation unit that, when the machining area shape is a chamfering target part, generates chamfering tool-path data for chamfering according to chamfering data including the machining-area shape data, data on tool-to-be-used, and data on machining condition. When performing chamfering on a boundary of the shaped raw material and the machining area shape defined on a curved surface that is a shaped raw material, the chamfering tool-path generation unit generates a machining path, as the chamfering tool-path data, for realizing chamfering by using 2-axis machining of a rotating axis parallel to a central axis of the shaped raw material and with a linear axis parallel to a bottom surface of the machining area shape.

5 Claims, 15 Drawing Sheets

(52) U.S. Cl.
CPC ............. *G05B2219/35333* (2013.01); *G05B 2219/35341* (2013.01); *G05B 2219/45162* (2013.01); *Y02P 90/265* (2015.11)

(56) References Cited

U.S. PATENT DOCUMENTS

| | | | | |
|---|---|---|---|---|
| 5,815,400 | A * | 9/1998 | Hirai | G05B 19/401 700/173 |
| 5,991,528 | A * | 11/1999 | Taylor | G05B 19/41865 700/95 |
| 6,112,133 | A * | 8/2000 | Fishman | G05B 19/40937 700/180 |
| 9,152,143 | B2 * | 10/2015 | Iriguchi | G05B 19/40931 |
| 2003/0130758 | A1 * | 7/2003 | Hirano | G05B 19/4097 700/182 |
| 2006/0058908 | A1 * | 3/2006 | Kamiya | G05B 19/4093 700/186 |
| 2007/0027571 | A1 * | 2/2007 | Kamiya | G05B 19/4093 700/182 |
| 2012/0089242 | A1 * | 4/2012 | Iriguchi | G05B 19/40931 700/98 |
| 2012/0089246 | A1 | 4/2012 | Mitani et al. | |

FOREIGN PATENT DOCUMENTS

| | | |
|---|---|---|
| JP | 3323569 B2 | 9/2002 |
| JP | 2003-177810 A | 6/2003 |
| JP | 4503326 B2 | 7/2010 |
| JP | 2010-262528 A | 11/2010 |
| JP | 2011-227584 A | 11/2011 |
| WO | 2011/004584 A1 | 1/2011 |
| WO | 2011/004585 A1 | 1/2011 |

OTHER PUBLICATIONS

Ji, Wei, et al. "A study on geometry modelling of a ball-end mill with chamfered cutting edge." Journal of Manufacturing Processes 19 (2015): 205-211.*

Communication dated Jun. 22, 2015 from the German Patent and Trademark Office issued in corresponding German application No. 112012006923.4.

International Search Report for PCT/JP2012/078223 dated Dec. 4, 2012.

Communication dated Nov. 25, 2015 from the Intellectual Property Office of the P.R. China issued in corresponding Application No. 201280076709.9.

* cited by examiner (a)

(b)

| EDGE NUMBER | 0 | 1 | 2 | 3 |
|---|---|---|---|---|
| LEFT-SIDE MACHINING AREA NUMBER | 1 | 1 | 1 | 1 |
| LEFT-SIDE MACHINING AREA SURFACE NUMBER | 1 | 1 | 1 | 1 |
| RIGHT-SIDE MACHINING AREA NUMBER | 3 | 3 | 3 | 3 |
| RIGHT-SIDE MACHINING AREA SURFACE NUMBER | 1 | 4 | 3 | 2 |

(a)

(b)

(a)

(b)

(c)

(d)

(a)

(b)

(c)

(a)

(b)

(c)

AUTOMATIC PROGRAMMING DEVICE AND METHOD

CROSS REFERENCE TO RELATED APPLICATIONS

This application is a National Stage of International Application No. PCT/JP2012/078223 filed Oct. 31, 2012, the contents of all of which are incorporated herein by reference in their entirety.

FIELD

The present invention relates to an automatic programming device and an automatic programming method.

BACKGROUND

An automatic programming device receives machining-area data on performing partial machining. The machining data includes data regarding the shape of the machining area, the machining method, the cutting tool to be used, and the machining conditions. The automatic programming device then generates control-command information for operating a machine tool according to the input machining-area data. In the automatic programming device, chamfering is machining mainly performed to remove a corner portion of a boundary where adjacent surfaces intersect with each other. If chamfering is applied to a curved surface, the boundary of the curved surfaces is the machining target, and thus the shape of the chamfered portion becomes complicated. Due to this complexity, chamfering is generally performed by a 5-axis control machine and the like (see, for example, Patent Literature 1).

With chamfering, it is sufficient to remove corner portions, and thus high accuracy is not required thereof. Chamfering methods vary according to the part to be chamfered or depending on the material, and thus instruction methods for chamfering also differ accordingly.

CITATION LIST

Patent Literature

Patent Literature 1: International Publication No. WO2011/004584 (FIG. 17 to FIG. 21)

SUMMARY

Technical Problem

Chamfering a part with a complicated shape that includes a curved surface is conventionally performed using a machine tool with 5-axis control; however, a 5-axis control machine is expensive. Furthermore, while a 5-axis control machine can perform complicated operations, there is a problem in that an NC (Numerical Control) program and operations of the 5-axis control machine tend to be complicated. Furthermore, using numerically controlled machines having only three straight axes are frequently not adequate enough for chamfering curved surface parts to the degree required in specifications.

The present invention has been achieved in view of the above problems, and an objective of the present invention is, when performing chamfering on a shaped raw material with a curved surface, to provide an automatic programming device and an automatic programming method that can generate tool path data for moving a tool such that it machines with simple operations and without using machining with 5-axis control.

Solution to Problem

In order to achieve the objective, the present invention relates to an automatic programming device that generates control-command data on the basis of machining-area data for partial machining of a shaped raw material. The automatic programming device includes: a machining-area-shape generation unit that generates machining-area shape data that corresponds to a machining area shape machined on the basis of the machining-area data; and a chamfering tool-path generation unit that, when the machining area shape is a chamfering target part, generates chamfering tool-path data for chamfering according to chamfering data including the machining-area shape data, tool-to-be-used data, and machining condition data. The chamfering tool-path generation unit, when performing chamfering on a boundary of the machining-area shape defined on a curved surface that is the shaped raw material the shaped raw material, generates a machining path, as the chamfering tool-path data, for realizing chamfering by using 2-axis machining with a rotating axis parallel to a central axis of the shaped raw material and with a linear axis parallel to a bottom surface of the machining area shape.

Advantageous Effects of Invention

According to the present invention, a chamfering tool-path generation unit is provided that generates chamfering tool-path data for realizing chamfering by t-axis machining with a rotating axis parallel to the central axis of the shaped raw material and a linear axis parallel to the bottom surface of the shaped machining area. Therefore, a chamfering tool path can be generated for a chamfered part on a curved surface part with a simple operation without using a 5-axis control machine so as to reduce the operation time and to improve the machining efficiency.

DESCRIPTION OF EMBODIMENTS

Exemplary embodiments of an automatic programming device and an automatic programming method according to the present invention will be described below in detail with reference to the accompanying drawings. Note that the present invention is not limited to the embodiments.

The embodiment realizes chamfering in which, without using of a 5-axis machining machine, a substantially uniform chamfering width is realized to an acceptable accuracy of a complicated shaped part that is to be chamfered on a curved surface by using 2-axis machining. The 2-axis machining utilizes a rotating axis parallel to a central axis of the curved surface of the shaped raw material and a linear axis parallel to the bottom surface of the shaped machining area.

Figure 1:
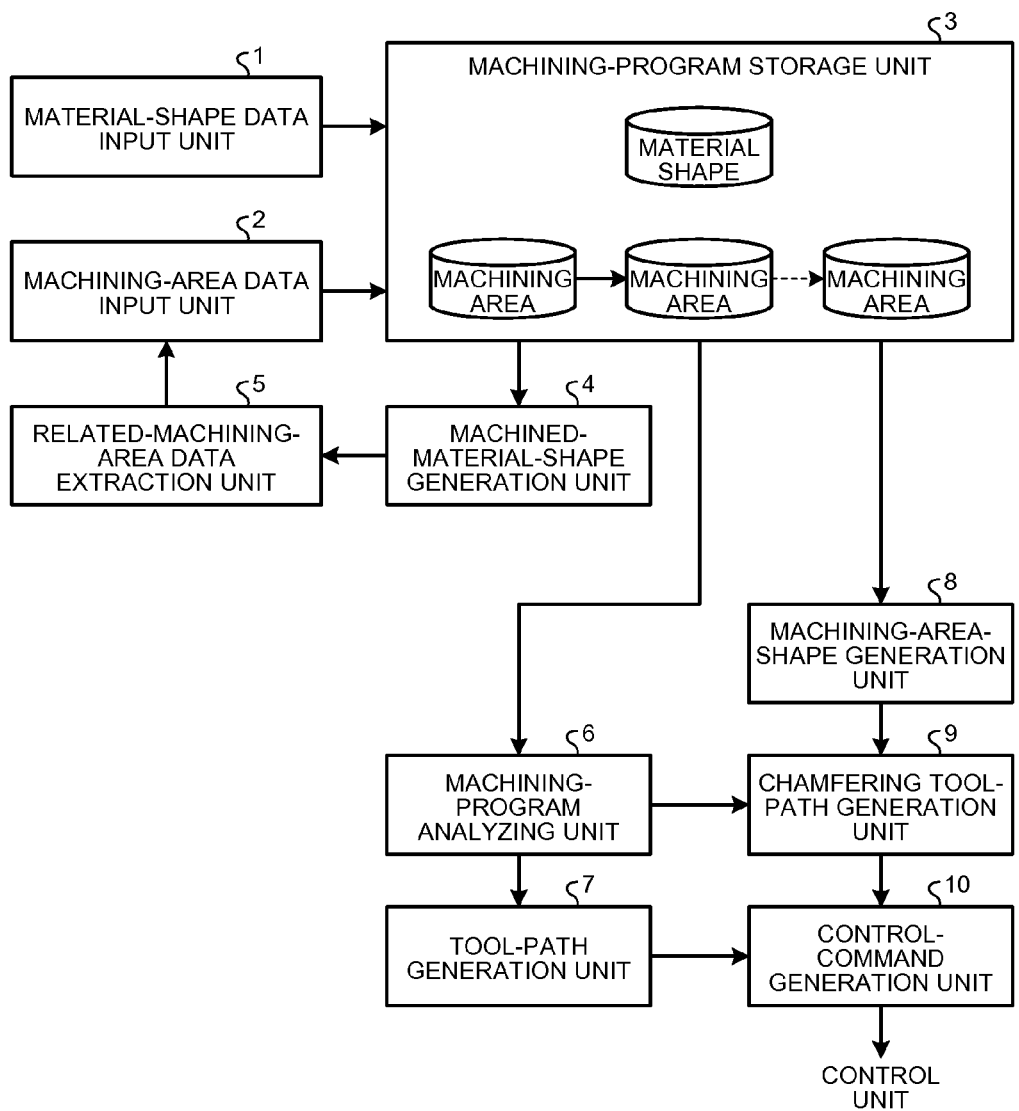
FIG. 1 is a schematic block diagram illustrating a functional configuration of an automatic programming device according to an embodiment of the present invention.

FIG. 1 is a schematic block diagram illustrating a functional configuration of an automatic programming device according to the present embodiment. The automatic programming device generates control-command data on the basis of machining-area data for partial machining or for partially machining of a shaped raw material. More specifically, the automatic programming device receives therein an input of machining-area data for partial machining that includes data such as the machining area shape, the machining method, the tool to be used, and the machining conditions. The automatic programming device then analyzes the machining-area data and generates control-command data for operating a machine tool.

As illustrated in FIG. 1, the automatic programming device includes the following: a shaped raw material data input unit 1, a machining-area data input unit 2, a machining-program storage unit 3, a machined-material shape generation unit 4, a related-machining-area data extraction unit 5, a machining-program analyzing unit 6, a tool-path generation unit 7, a machining-area shape generation unit 8, a chamfering-tool path generation unit 9, and a control-command generation unit 10.

The material-shape data input unit 1 inputs material-shape data that defines the shaped raw material of a machining target from outside and stores the material-shape data in the machining-program storage unit 3.

The machining-area data input unit 2 inputs machining-area data, which is other-machining-area-reference type, that refers to machining-area shape data included in machining-area data stored in the machining-program storage unit 3, and then it outputs the other-machining-area-reference type machining-area data to the machining-program storage unit 3. Specifically, the machining-area data input unit 2 inputs machining-area data, from outside, which defines machining units such as the machining area shape, the machining method, the tool to be used, and the machining conditions, and then it stores the machining-area data in the machining-program storage unit 3. An example of the other-machining-area-reference type machining-area data includes machining-area data for chamfering.

The machining-program storage unit 3 stores therein material-shape data and a list containing machining-area data including other-machining-area-reference type machining-area data arranged in the order of machining.

The machined-material-shape generation unit 4 generates machined-shaped raw material data on the basis of the material-shape data and the machining-area data stored in the machining-program storage unit 3. The machined-shaped raw material data is machining-area-removal shaped raw material data having a machining area shape of a defined machining area, which is removed from a shaped raw material on the basis of the shaped raw material data and machining area data of the defined machining unit.

When machining-area data for chamfering is input, from outside, to the machining-area data input unit 2, the related-machining-area data extraction unit 5 graphically displays the machined-shaped raw material data generated by the machined-material-shape generation unit 4. In response to a chamfer-target area instruction from an operator, the related-machining-area data extraction unit 5 attaches data for identifying the surface of the machining area shape of the corresponding shaped raw material as an attribute to a surface of a machining area shape copied to a machining-area-removal shaped raw material, and it then extracts, from a designated edge on the machining-area-removal shaped raw material, data for identifying the surface of the machining area shape of a machining area that is attached to a surface adjacent to the edge. The related-machining-area data extraction unit 5 then extracts reference data for other-machining-area-reference type machining-area shape data of a machining area from the extracted data, and it then transmits the reference data to the machining-area data input unit 2.

When a control-command is generated from a machining program, the machining-program analyzing unit 6 analyzes the machining-area data stored in the machining-program storage unit 3 and obtains tool-path generation data regarding such as tool data and machining condition data for generating tool path data. The machining-program analyzing unit 6 then transmits the tool-path generation data to the tool-path generation unit 7 and the chamfering-tool path generation unit 9.

The tool-path generation unit 7 generates tool path data for a machining area other than for chamfering from machining-area data, and it then transmits the tool path data to the control-command generation unit 10.

When machining data is analyzed and control-command data is generated, the machining-area-shape generation unit 8 generates machining-area shape data of machining data for partial machining, i.e., machining-area shape data of a part to be chamfered from the machining-area shape data referred to by other-machining-unit-reference type machining data and the material-shape data stored in the machining-program storage unit 3. The machining-area-shape generation unit 8 then transmits the machining-area shape data of a part to be chamfered to the chamfering tool-path generation unit 9.

The chamfering tool-path generation unit 9 generates tool path data for chamfering the machining unit from the machining-area shape data for chamfering that is extracted for a machining unit of chamfering in the machining-area-shape generation unit 8 and the tool-path generation data extracted by the machining-program analyzing unit 6, and the tool path data is then transmitted to the control-command generation unit 10.

The control-command generation unit 10 generates control-command data on the basis of machining data for partial machining including machining-area shape data. Specifically, the control-command generation unit 10 receives the tool path data generated by the tool-path generation unit 7 and the chamfering tool-path generation unit 9, generates control-command data for controlling the machine tool, and outputs the control-command data to a control unit (not illustrated) of a control device.

Figure 2:
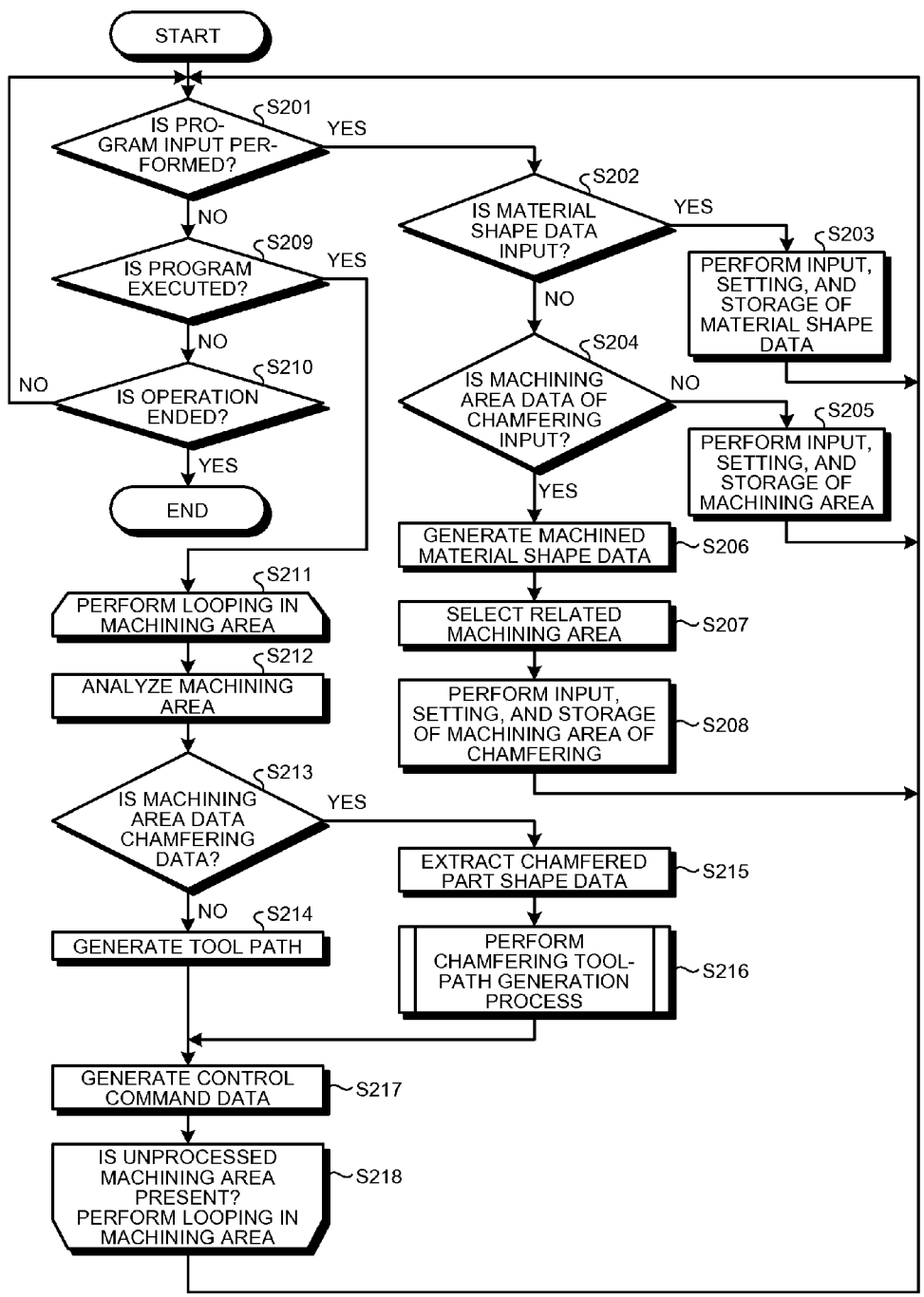
FIG. 2 is a flowchart illustrating an example of an operation process procedure of the automatic programming device according to the present embodiment.

An operation of the automatic programming device with such a configuration is described here. FIG. 2 is a flowchart illustrating an example of an operation process procedure of the automatic programming device according to the present embodiment.

The automatic programming device checks whether an operator's instruction is given to perform program input (Step S201). When an instruction to perform program input is given (YES at Step S201), the automatic programming device checks whether the operator instructs that material-shape data be input (Step S202). When an instruction to input material-shape data is given (YES at Step S202), material-shape data is input from outside to the material-shape data input unit 1 due to the instruction and the like by an operator, and the input data is stored in the machining-program storage unit 3 (Step S203). The process then returns to Step S201.

When an instruction not to input material-shape data is given (NO at Step S202), the automatic programming device checks whether the operator instructs input machining data for chamfering to be input (Step S204). When an instruction not to input machining data for chamfering is given (NO at Step S204), machining data other than chamfering is input from outside to the material-shape data input unit 1 due to an instruction by the operator, and the input data is stored in the machining-program storage unit 3 (Step S205). Details of input of the machining data other than chamfering are described in Patent Literature 1, and thus descriptions thereof will be omitted here. The process then returns to Step S201.

Figure 3:
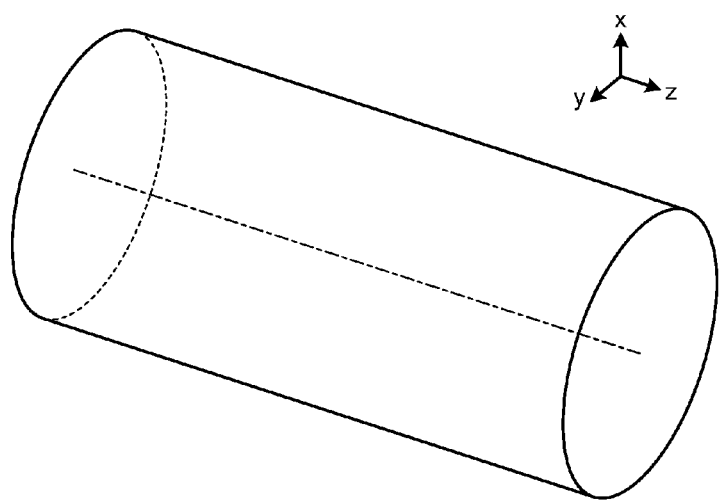
FIG. 3 is a perspective view illustrating the shaped raw material before and after machining.
Figure 3:
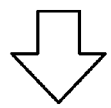
Figure 3:
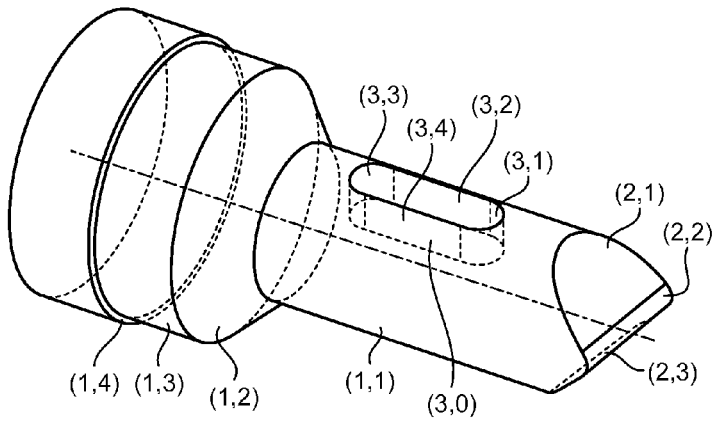

When an instruction to input machining data for chamfering is given (YES at Step S204), machined-material shape data is generated by the machined-material-shape generation unit 4 on the basis of the shaped raw material stored in the machining-program storage unit 3 and the machining data that has already been stored (Step S206). FIG. 3 is a perspective view illustrating a shaped raw material before and after machining. FIG. 3(*a*) is a perspective view illustrating a shaped raw material before outer-diameter turning; and FIG. 3(*b*) is a perspective view illustrating a shaped raw material after machining that is formed by three machining units, i.e., outer-diameter turning, pocket machining, and key groove machining. As illustrated in FIG. 3, the shaped raw material after machining is formed by removing machining area shapes corresponding to the respective machining units from the shaped raw material. In FIG. 3(*b*), the pair (i, j) indicates a machining unit and a machining surface. i denotes a machining unit number and j denotes a surface number of a machining target surface that is the corresponding surface representing the position of a machined shape. In this example, i=1 denotes outer-diameter turning, i=2 denotes pocket machining, and i=3 denotes key groove machining.

Figure 4:
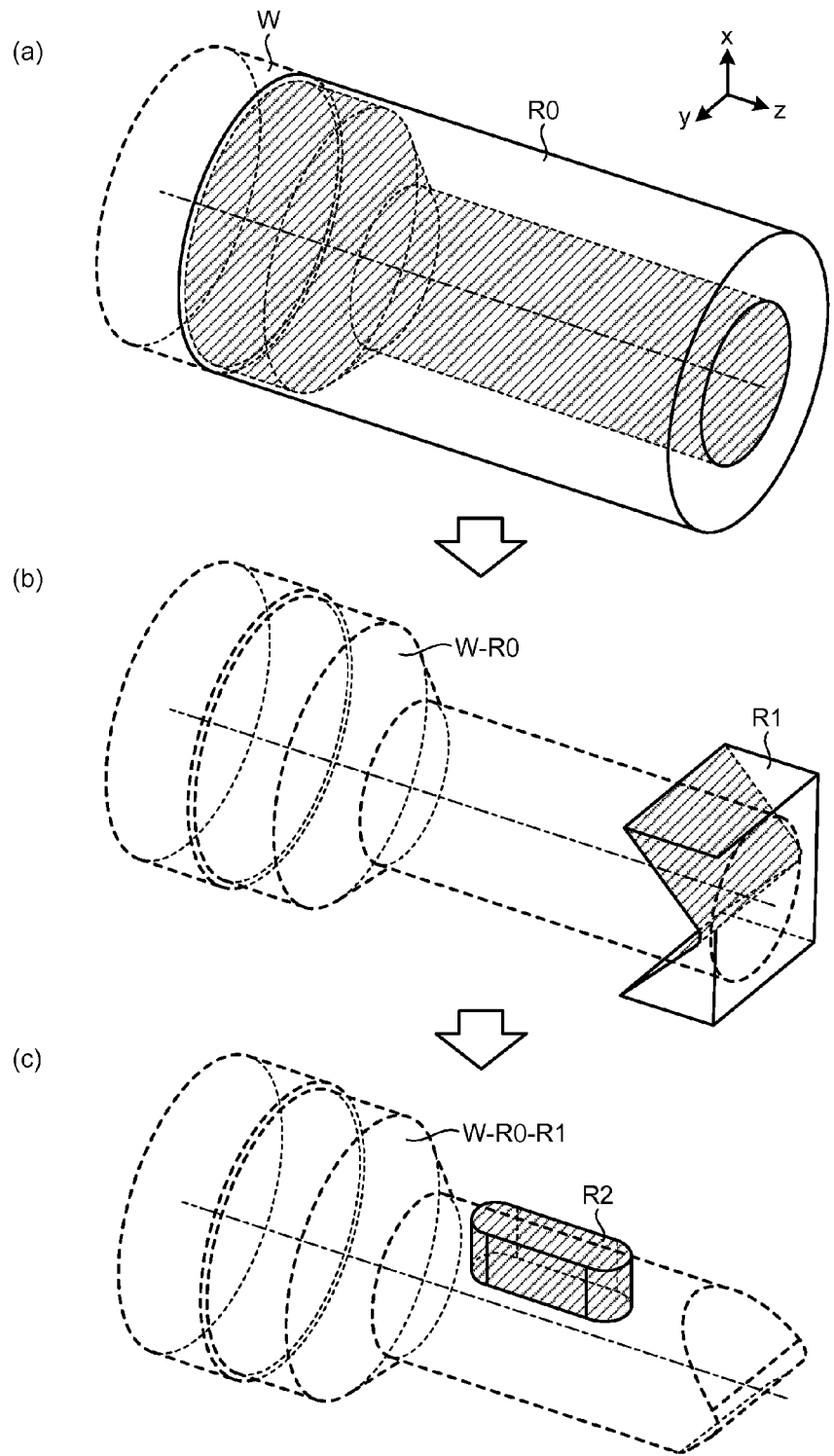
FIG. 4 is a perspective view illustrating machining area shapes of three respective machining units.

FIG. 4 is a perspective view illustrating machining area shapes of three respective machining units. FIG. 4(*a*) illustrates a shaped raw material W and a machining area shape R0 of outer-diameter turning. FIG. 4(*b*) illustrates a machined shaped raw material W-R0 having a machining area shape of outer-diameter turning removed therefrom and a machining area shape R1 of pocket machining. FIG. 4(*c*) illustrates a machined shaped raw material W-R0-R1 having a machining area shape of pocket machining removed therefrom and a machining area shape R2 of key groove machining. Further, when the machining area shape R2 of key groove machining is removed from the machined shaped raw material W-R0-R1, the machined shaped raw material illustrated in FIG. 3(*b*) is obtained. When a machining area shape is removed from a shaped raw material or a machined shaped raw material, as illustrated in FIG. 3(*b*), a pair of the machining unit number i and the machining target surface number j is attached as a piece of attribute information on a machining target surface of a machining area shape copied to a machined shaped raw material after removal.

Next, the related-machining data extraction unit 5 extracts identification data that identifies machining-area shape data of a machining unit relating to a chamfering target part on the basis of the machined-material shape data generated by the machined-material-shape generation unit 4 (Step S207). The extraction is as follows: The machined-material shape data is graphically displayed on a screen first, and a series of edges of a chamfering target part in the machined-material shape data is selected by an instruction by the operator using a pointing device and the like. The edge that may be a selection candidate is an edge between machining target surfaces belonging to different machining units copied to a machined material shape or an edge between a surface of a shaped raw material and a machining target surface. Next, for every selected edge, attribute data given to a machining target surface adjacent to a selected edge is extracted as the identification data of the machining-area shape data relating to the chamfering target part.

Figure 5:
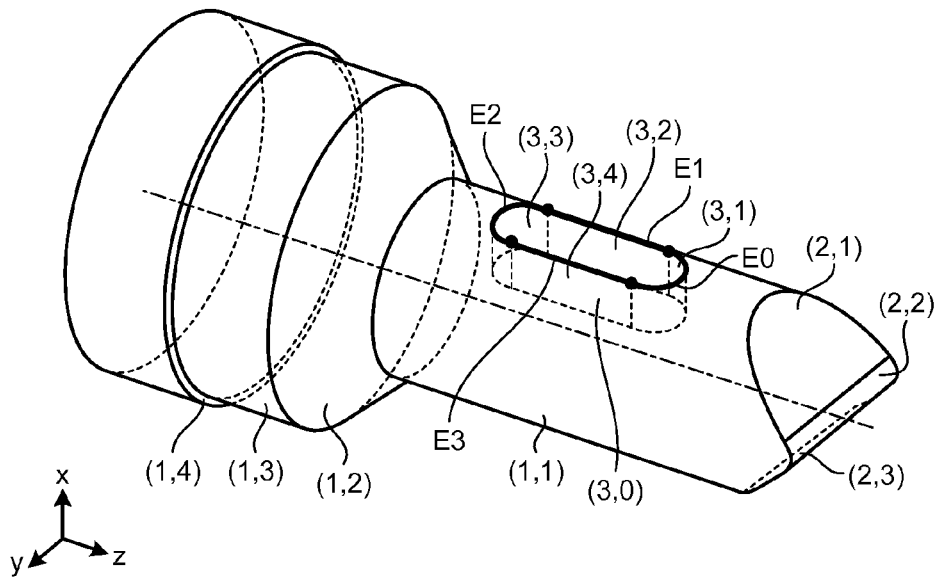
FIG. 5 is a perspective view illustrating an edge selected as a chamfering target part.
Figure 6:
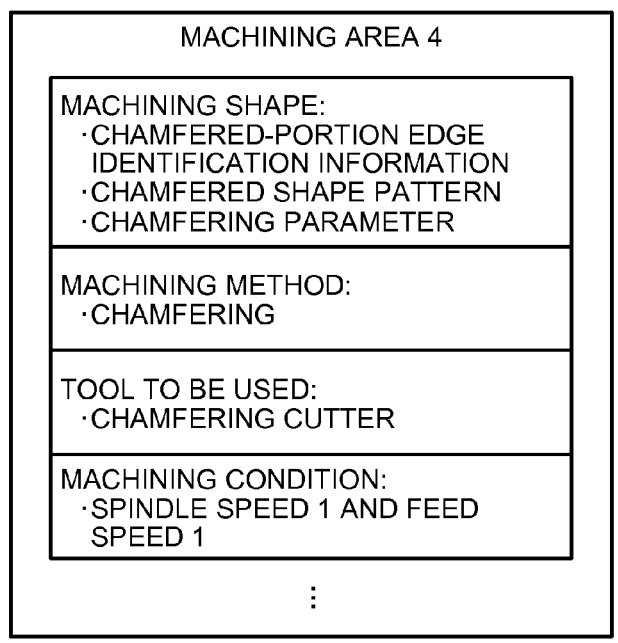
FIG. 6 illustrates an example of machining-area data for chamfering.
Figures 7, 8:
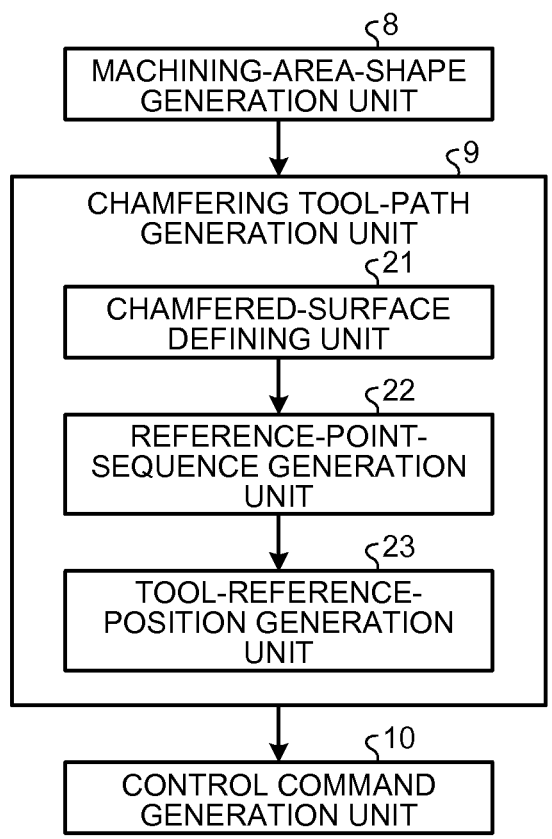
FIG. 7 illustrates an example of information for identifying the edge of a chamfered portion.
FIG. 8 is a block diagram illustrating a functional configuration of a chamfering-tool path-generation unit according to the present embodiment.

FIGS. 5 to 7 illustrate an example of a machining unit of chamfering of a selected edge. FIG. 5 is a perspective view illustrating an edge selected as a chamfering target part. FIG. 6 illustrates an example of machining-area data for chamfering. FIG. 7 illustrates an example of information for identifying chamfered-portion edge.

In FIG. 5, an edge is illustrated by a thick line, and Ek (k=0, 1, 2, 3) denotes an edge number that indicates an edge selected as the chamfering target part. Coordinates (i, j) indicates a machining unit and a machining surface. i denotes a machining unit number and j denotes a machining target surface number.

The machining-area data for chamfering illustrated in FIG. 6 includes, as machining shape data, information for identifying chamfered-portion edge, chamfered shape patterns, and parameters specifying the size or the angle of a surface and a shape, and the like. Additionally, the machining-area data for chamfering also includes parameters specifying a machining method, a tool to be used, a machining condition, and the like.

The information for identifying a chamfered-portion edge illustrated in FIG. 6 is data for referring to machining-area shape data relating to a machining target part and, as illustrated in FIG. 7, is configured as a table in which extracted identification data of machining-area shape data is listed. In the table of the information for identifying a chamfered-portion edge, a combination of machining target surfaces adjacent to an edge of a chamfering target part is represented. Furthermore, the machining target surface is represented by a machining unit number and a machining target surface number of a machining unit. However, the table does not include position information on the edge of the chamfering target part as direct data. The position information of the edge of the chamfering target part is calculated when generating control-command data. Accordingly, even when the position of machining-area shape data of a machining unit, to which reference is made, is adjusted, adjustment results on control-command data for chamfering can be automatically reflected, and thus it becomes less laborious to adjust machining-area data for chamfering.

Next, the identification data of machining-area shape data extracted by the related-machining-area data extraction unit 5 and other machining-area data for chamfering are input, and machining-area data for chamfering is stored in the machining-program storage unit 3 (Step S208). The process then returns to Step S201.

When an instruction not to perform program input is given at Step S201 (NO at Step S201), the automatic programming device checks whether execution of a program is instructed by the operator (Step S209). When there is no instruction to execute a program (NO at Step S209), then it is determined whether an instruction to end the operation is given by the operator (Step S210). When an instruction to end the operation is not given by the operator (NO at Step S210), the process returns to Step S201. When an instruction to end the operation is given by the operator (YES at Step S210), the program ends and the process then ends.

When there is an instruction to execute a program at Step S209 (YES at Step S209), a loop process is performed, which takes out the machining-area data stored in the machining-program storage unit 3 piece by piece so as to generate control-command data (Steps S211 to S218). The loop process is described below in detail.

The machining-program analyzing unit 6, first, analyzes the content of machining-area data corresponding to the process target for generation of the tool path data (Step S212). Next, whether the machining-area data corresponding to a process target is chamfering data is checked (Step S213). When the machining-area data is not chamfering data (NO at Step S213), a tool path is generated for machining-area data other than chamfering by the tool-path generation unit 7 (Step S214).

When the machining-area data is chamfering data (YES at Step S213), with respect to machining-area data for chamfering, the machining-area-shape generation unit 8 extracts shape data for a chamfering target part from the material-shape data stored in the machining-program storage unit 3 and machining-area shape data on a machining unit to which the machining-area data for chamfering refers; and then the extracted data is transferred to the chamfering tool-path generation unit 9 (Step S215). For every edge of the chamfering target part, a machining unit number and a surface number in the machining-area shape data are referred to, and two pieces of surface data of the machining area shape are extracted from the information for identifying the chamfered-portion edge illustrated in FIG. 7. A chamfering tool path is then generated on the basis of the data relating to an edge of a chamfered part transferred at Step S215 (Step S216).

Subsequently, or after Step S214, the control-command generation unit 10 receives data on the tool path and the chamfering tool path, generates control-command data for operating the machine tool (Step S217), and outputs the control-command data to a control unit of a numerical control device. When the chamfering tool path is generated at Step S216, control-command data is generated on the basis of the tool path data and the chamfering tool path.

Thereafter, whether an unprocessed machining unit is present is checked (Step S218). When an unprocessed machining unit is present, the process is looped between Steps from S211 to S218. When an unprocessed machining unit is not present, the process returns to Step S201.

FIG. 8 is a block diagram illustrating a functional configuration of a chamfering tool-path generation unit according to the present embodiment. The chamfering tool-path generation unit 9 acquires machining-area shape data of a part to be chamfered from the machining-area-shape generation unit 8. For the present embodiment, generation of a chamfering tool path on the basis of data relating to an edge of a chamfered portion that is input from the machining-area-shape generation unit 8 is described in detail here.

The chamfering tool-path generation unit 9 acquires chamfering data from a data storage unit in which data relating to chamfering is stored, and it then generates a chamfering tool path. While the machining-area-shape generation unit 8 corresponds to the data storage unit in the present embodiment, depending on the content of the acquired data, data can also be distributed to the machining-program storage unit 3. The chamfering tool-path generation unit 9 acquires data from the data storage unit, generates tool reference position data for generating a tool path, and transfers tool reference position data to the control-command generation unit 10 that performs the next process.

As illustrated in FIG. 8, the chamfering tool-path generation unit 9 includes a chamfered-surface defining unit 21, a reference-point-sequence generation unit 22, and a tool-reference-position generation unit 23, and it controls a machining operation by, for example, a machining center.

For an intersecting edge of a machining surface and a surface adjacent to the edge extracted as a chamfering target part on the basis of data relating to chamfering, the chamfered-surface defining unit 21 defines a chamfered surface after chamfering (hereinafter, "chamfered surface") by a chamfered shape pattern attached to the intersecting edge as an attribute.

The reference-point-sequence generation unit 22 generates a point sequence that serves as a reference that is used when a chamfering tool path is generated on the basis of data relating to chamfering. In the present embodiment, an intersection line, which is obtained by projecting a bottom surface shape of a chamfered part on a curved surface of a shaped raw material, is an intersecting edge; and a reference point is set on the intersecting edge.

The tool-reference-position generation unit 23 calculates a reference position of a machining tool when the tool moves while performing chamfering on the basis of data relating to chamfering and the reference point generated by the reference-point-sequence generation unit 22. Here, an axis parallel to a central axis of a curved surface of a shaped raw material is set as a rotating axis. The tool reference position is then calculated so that chamfering is performed by 2-axis machining with the rotating axis and a linear axis parallel to a bottom surface shape; and the chamfering tool path is generated.

The processes performed by the chamfered-surface defining unit 21 and the reference-point-sequence generation unit 22 relate to the shape and are not influenced by the machining method and the machining condition, and thus it is permissible to generate a reference point by, for example, using the method described in Patent Literature 1.

Figure 9:
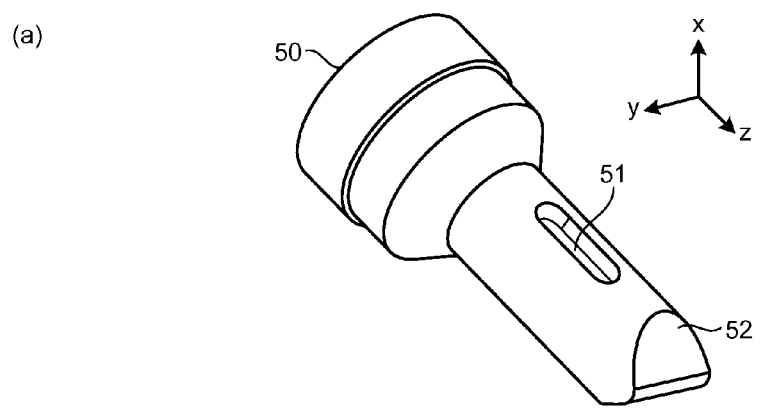
FIG. 9 illustrates an example of a shaped raw material used to explain the generation of a chamfering-tool path.
Figure 9:
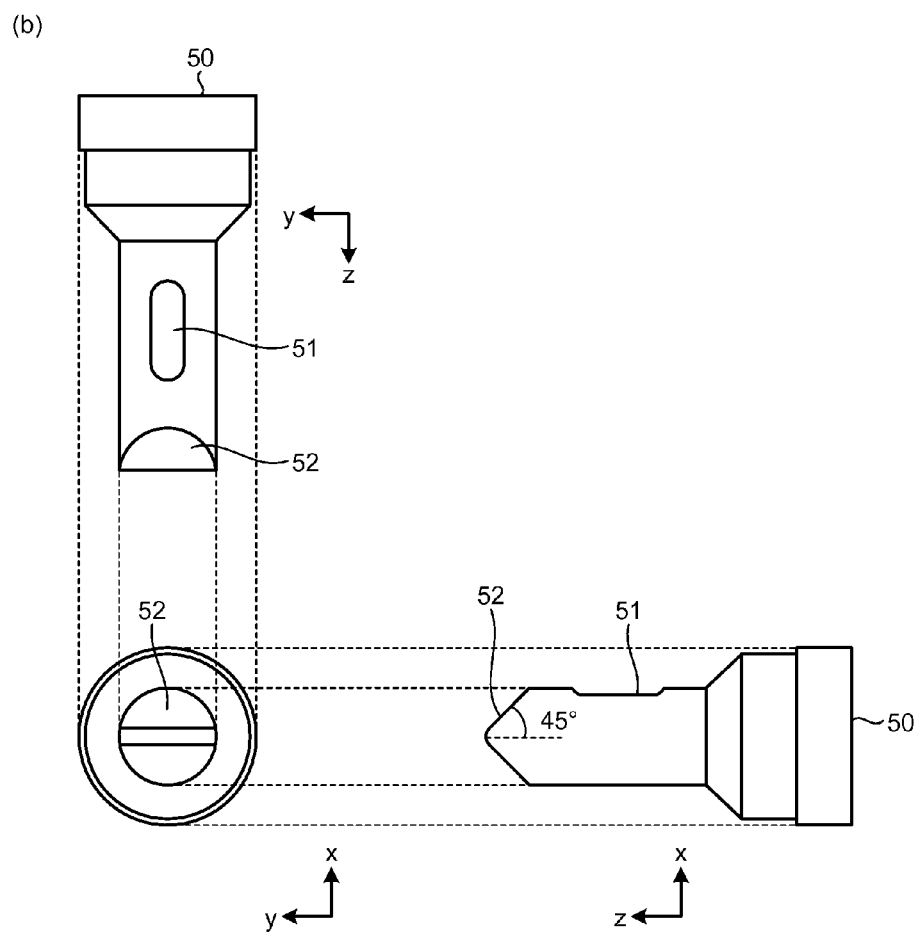

FIG. 9 illustrates an example of a shaped raw material used for explaining the generation of a chamfering tool path. FIG. 9(*a*) is a perspective view and FIG. 9(*b*) is a three-view orthographic drawing constituted by a top view, a front view, and a side view. In the case of a machined shaped raw material 50 illustrated in FIG. 9, chamfered parts 51 and 52 are identified by identification information on chamfered parts stored in a data storage unit. For example, the chamfered part 51 is subjected to key groove machining, and it is constituted by an intersecting edge of a cylindrical surface and a groove-like side surface with a depth in an x-axis direction. The chamfered part 52 is subjected to pocket machining, and it is constituted by an intersecting edge of a cylindrical surface and a surface inclined by 45° to the cylindrical surface.

Figure 10:
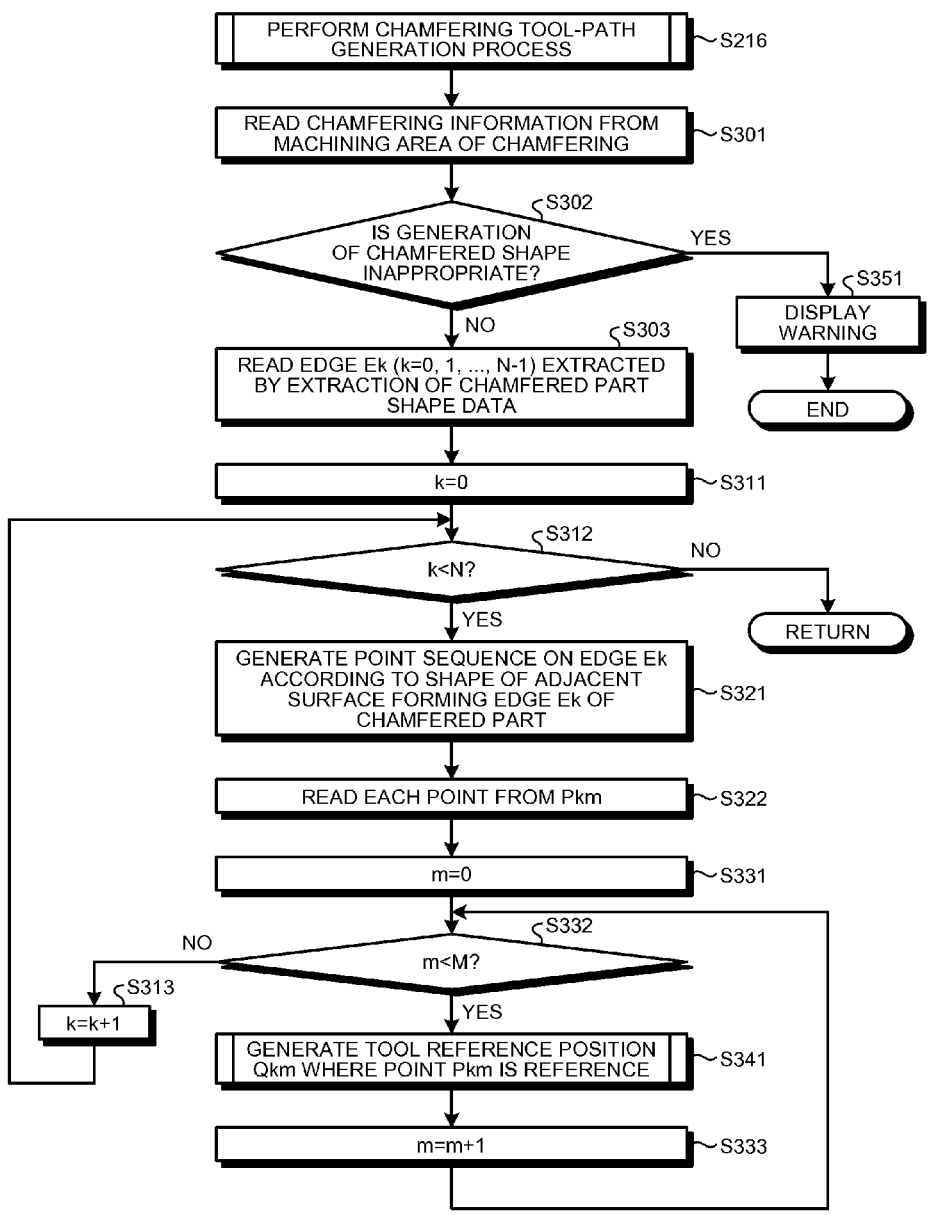
FIG. 10 is a flowchart illustrating an example of a procedure of a chamfering-tool path-generation process according to the present embodiment.

Regarding generation of a chamfering tool path, the generation of a tool path on the chamfered part 51 is described below. Specifically, the chamfering tool-path generation unit 9 performs the process according to, for example, a flowchart illustrated in FIG. 10. FIG. 10 is a flowchart illustrating an example of a procedure of a chamfering-tool path-generation process according to the present embodiment.

First, machining information is read out from a machining unit for chamfering that is stored in the machining-area-shape generation unit 8 (Step S301). Specifically, the machining information includes information on a tool used for chamfering, shape information on a part to be chamfered, a machining condition, a pattern and a parameter of a chamfered shape, and the like, and these pieces of information are stored for every machining unit.

Next, it is determined whether a chamfered surface shape after chamfering, which is defined on the basis of chamfered part shape data and a chamfered shape pattern in the read machining information, is inappropriate (Step S302). When it is determined that the generation of a chamfered shape on a target shape part is inappropriate (YES at Step S302), the process exits a chamfering-tool path-generation process relating to the read machining unit; a warning is displayed to an operator (Step S351); and the process ends.

When generation of the chamfered shape is not inappropriate (NO at Step S302), an edge Ek (k=0, 1, . . . , N−1) (N is the total number of edges) is read out. The Ek, here, is extracted by a chamfered part shape data extraction process that corresponds to Step S215 of the flowchart illustrated in FIG. 2 (Step S303). The process is sequentially performed on the read edge Ek, and thus k=0 is set (Step S311). It is then determined whether k is smaller than N (Step S312).

When k<N is satisfied (YES at Step S312), a reference point sequence serving as a reference of a tool path is obtained for the edge Ek that is read out (Step S321). There are several methods of calculating a reference point from an edge, in the present embodiment, when an edge is a straight line, the ends of the line are set as reference points, and when the edge is a curved line, points, which divide the edge so that the edge is approximated by straight lines, are set as reference points. As an example of obtaining reference points, as described in Patent Literature 1, a three-dimensional target edge is copied to a plane; a copied two-dimensional edge is divided; and points on the original three-dimensional edge corresponding to a division points are set as reference points. With this process, the distances between two-dimensional division points may fluctuate depending on the division method used. In such a case, the division points are corrected so that the distances between the division points become appropriate. When the number of division points is equal to M, these division points are set as reference points Pkm (m=0, 1, . . . , (M−1)) for the edge Ek.

Figure 11:
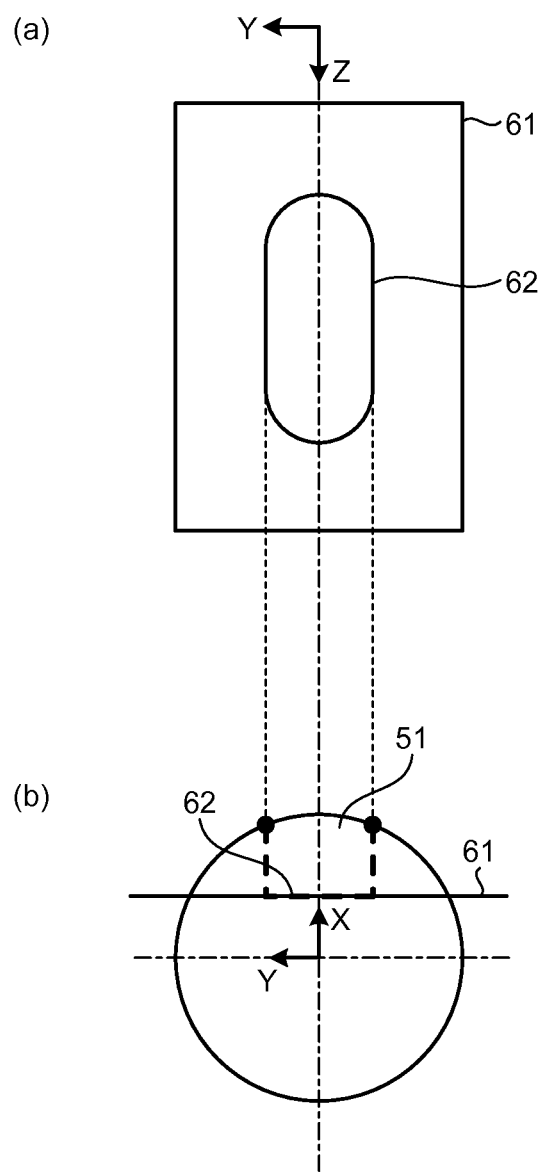
FIG. 11 is an explanatory diagram of a machined-portion specifying method that is processed by a general automatic programming device.
Figure 12:
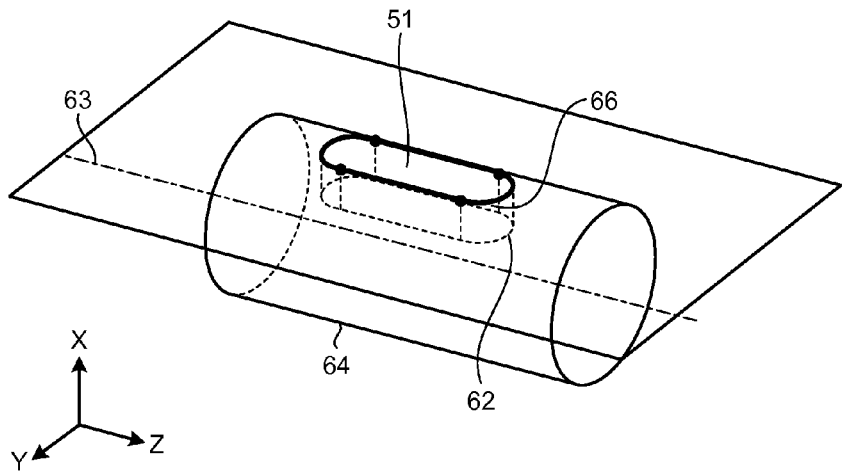
FIG. 12 is an explanatory diagram illustrating a machined-portion specifying method that is processed by the automatic programming device according to the present embodiment.

FIGS. 11 and 12 are explanatory diagrams of a method for specifying a machining part processed by an automatic programming device. FIG. 11 illustrates a general method for specifying a machining part. FIG. 11(*a*) is a top view illustrating a machining target and FIG. 11(*b*) is a side view illustrating the machining target. FIG. 12 illustrates a method for specifying a machining part according to the present embodiment. With the method for specifying a machining part processed by a general interactive automatic programming device, the height of a machining part is fixed, and thus it is adequate to only generate a path for a bottom surface shape of a specified machining part. For example, when the shape illustrated in FIG. 11 is machined by groove machining, it is adequate to only define a bottom surface shape 62 of a desired machining part on a plane 61 parallel to a Y-Z plane.

However, the height of a shape part for chamfering on a curved surface part as in the present embodiment is not fixed, and thus when a path for a bottom surface shape is used as in a general case, it is difficult to perform machining accurately. Accordingly, as illustrated in FIG. 12, a projected shape 66 obtained by projecting the bottom surface shape 62, which has been specified on a cylindrical surface 64, is set as a machining target part shape. That is, an intersection line portion obtained by projecting a plane shape of a machining part on a curved surface shape is set as the machining target part shape. The machining target part shape corresponds to an edge. The coordinate of a position corresponding to a division point (a reference point) of the intersection line portion is then obtained. As a result, it is possible to significantly reduce the calculation amount as compared to a case of calculating an intersection line defined by curved surface shapes. Process data required for the case illustrated in FIG. 12 can be obtained if information on a tool axis direction, which is included in a machining condition in addition to a bottom surface shape of a machining part identical to the data of FIG. 11, is obtained; and thus it is possible to lessen the work load of the operator.

A process of obtaining a reference position of a chamfering tool when the tool moves while performing chamfering is then performed. An example is described here where a chamfering path is generated by using a chamfering tool with 2-axis machining of a rotating axis parallel to a central axis 63 of a shaped raw material and a linear axis parallel to the bottom surface shape 62 of the chamfered part 51, as illustrated in FIG. 12. A method is described here for calculating a tool reference position Qkm from a reference point Pkm in a case of mechanical machining where the rotating axis is a C axis and the linear axis is in a Y-Z direction. A position of the tool reference position Qkm is determined in the height direction that is a tool axis direction and in the plane direction vertical to the tool axis; and machining of a shaped raw material by a chamfering tool is determined by the rotation amount of the C axis. Here, it is assumed that the chamfering is where the height of the tool reference position Qkm is fixed.

Each division point Pkm obtained from the read edge Ek is read out as a reference point (Step S322). m is set to 0 in order to sequentially perform the process on the respective read reference points Pkm (Step S331). It is then determined whether m is smaller than M (the total number of division points) (Step S332).

Figure 13:
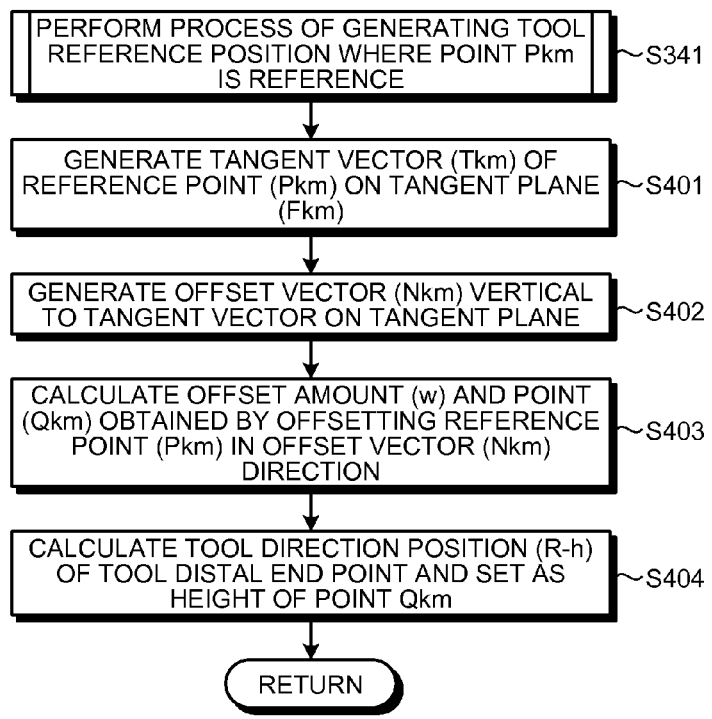
FIG. 13 is a flowchart illustrating an example of the procedure of a calculation method for a tool reference position.
Figure 14:
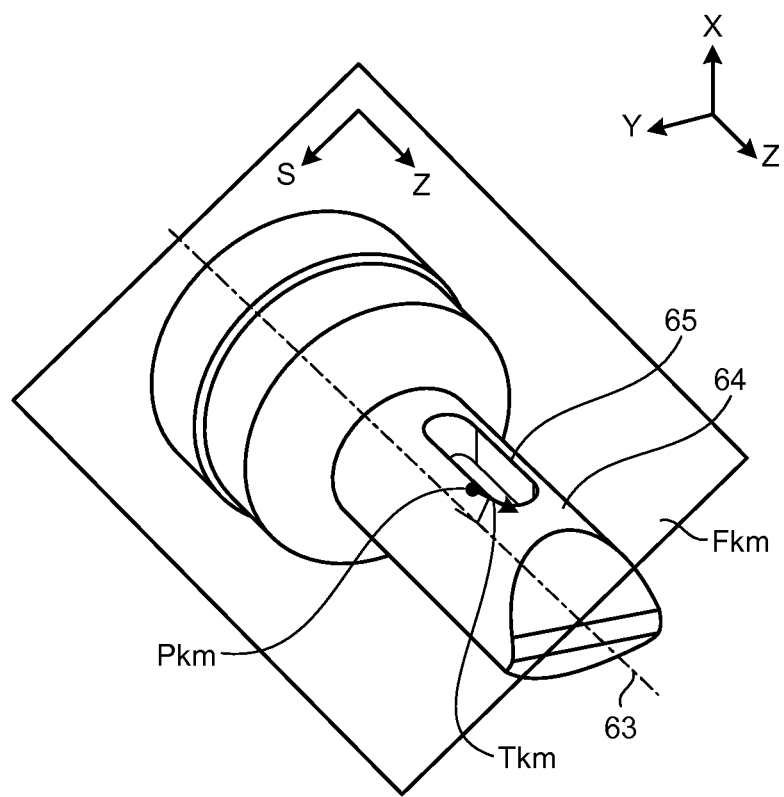
FIG. 14 is an explanatory diagram illustrating a tangent vector with respect to a reference point on a shaped raw material according to the present embodiment.
Figure 15:
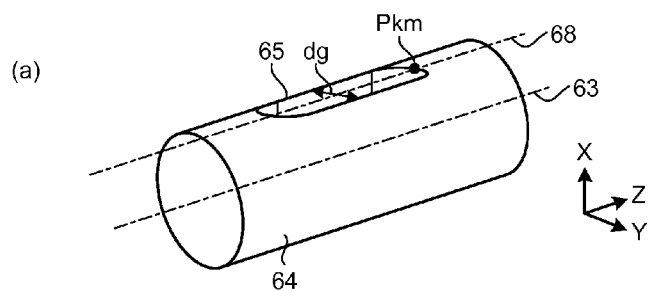
FIG. 15 is an explanatory diagram of a tangent plane with respect to a reference point on a shaped raw material according to the present embodiment.
Figure 15:
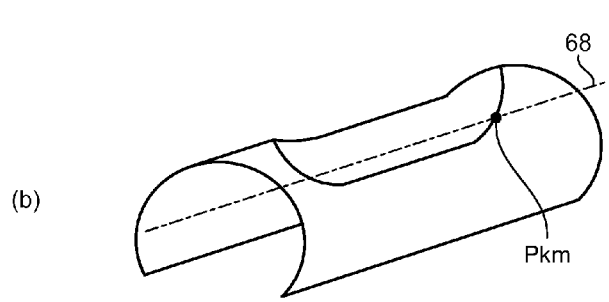
Figure 15:
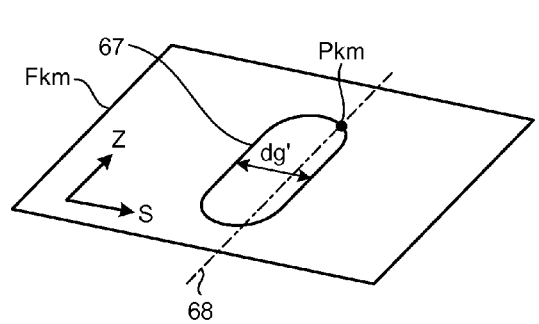
Figure 15:
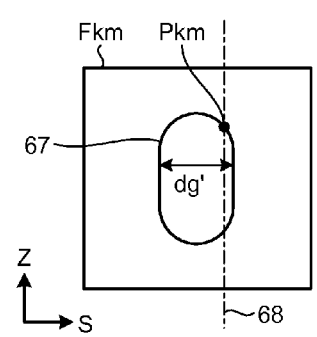
Figure 16:
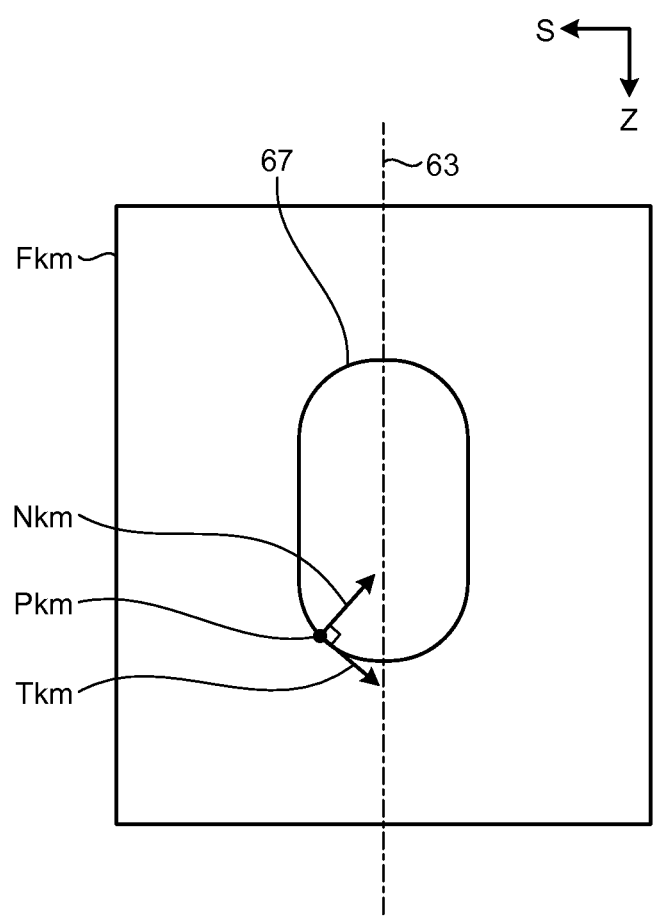
FIG. 16 is an explanatory diagram illustrating an offset vector with respect to a tangent vector according to the present embodiment.

When m is smaller than M (YES at Step S332), a calculation is performed for generating the tool reference position (a tool distal end point) Qkm with respect to the reference point Pkm (Step S341). FIG. 13 is a flowchart illustrating an example of a procedure for a calculation method for a tool reference position. FIGS. 14 to 16 are explanatory diagrams on the procedure of the calculation method for a tool reference position. FIG. 14 is an explanatory diagram illustrating a tangent vector with respect to a reference point on a shaped raw material according to the present embodiment. FIG. 15 is an explanatory diagram of a tangent plane with respect to a reference point on a shaped raw material according to the present embodiment. FIG. 16 is an explanatory diagram illustrating an offset vector with respect to a tangent vector according to the present embodiment.

As illustrated in FIG. 14, a tangent vector Tkm is calculated, which is on a tangent plane Fkm for each reference point Pkm (m=0, 1, 2, . . . , M−1) acquired from the reference-point-sequence generation unit 22 (Step S401). The tangent plane Fkm is a plane that is tangent to the cylindrical surface 64 parallel to the central axis 63 at the reference point Pkm. As illustrated in FIG. 15(a), a side surface of the cylindrical surface 64 is cut open, with a straight line 68 being a reference that passes through the reference point Pkm and is parallel to the central axis 63 (FIG. 15(b)) so that the cylindrical surface 64 is made to be a plane (FIG. 15(c)). A shape 67 illustrated in FIG. 15(c) is a developed shape where an edge shape 65 on the cylindrical surface 64 of FIG. 15(a) is cut open. It is permissible that the shapes before and after development do not have a scaling relation; and, for example, the width of a groove before development may be different from that after development (dg<dg').

Next, as illustrated in FIGS. 15(c) and (d), it is assumed that coordinate axes in the coordinate system locally defined for the tangent plane Fkm are Z axis and S axis. The tangent plane Fkm is parallel to the Z axis; and thus the Z-axis coordinate value before cutting out the side surface of the cylindrical surface 64 is constant.

As illustrated in FIG. 16, an offset vector Nkm that is vertical to the tangent vector Tkm on the tangent plane Fkm is obtained (Step S402). The offset vector Nkm can be obtained by the cross product of a normal vector of the tangent plane Fkm and the tangent vector Tkm.

Next, as represented by the following expression (1), the reference point Pkm is offset by w using the offset vector Nkm obtained at Step S402 so that a position of the tool reference position Qkm on the tangent plane Fkm is calculated (Step S403). A calculation method for the offset amount w is described later.

$$Qkm = Pkm + w \cdot Nkm \quad (1)$$

The height in the tool axis direction at the tool reference position Qkm that is fixed is obtained (Step S404). A calculation method for the height is also described later. With the steps described above, the position of the tool reference position Qkm is obtained uniquely, and the process returns to Step S333 of FIG. 10.

Figure 17:
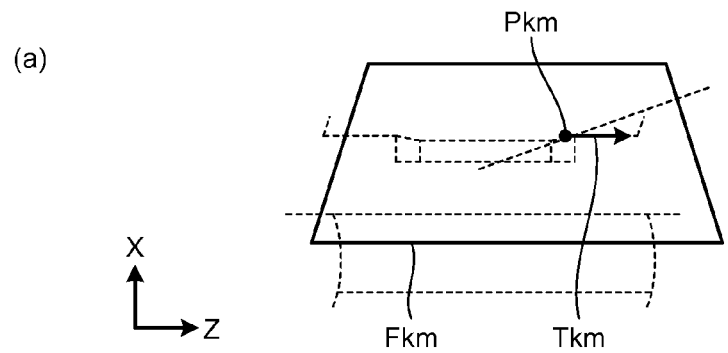
FIG. 17 is an explanatory diagram of a calculating method for a tool distal end point position according to the present embodiment.
Figure 17:
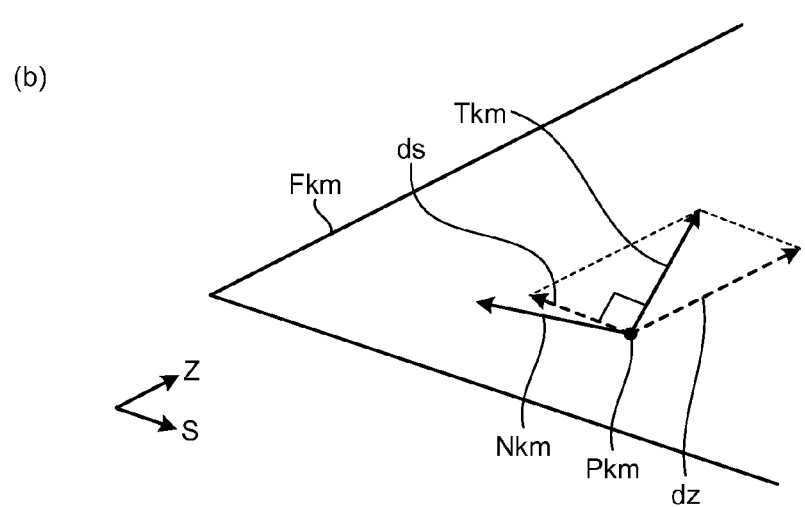
Figure 17:
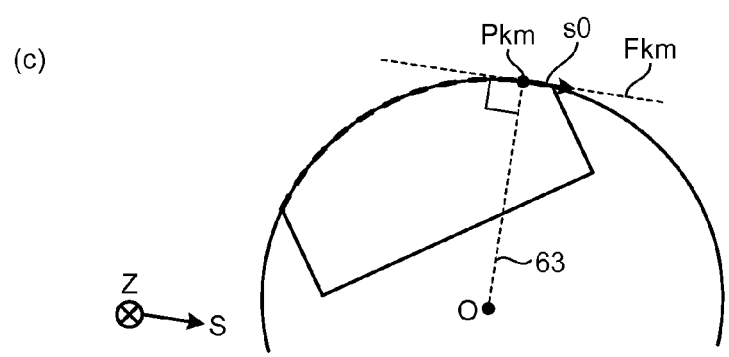
Figure 18:
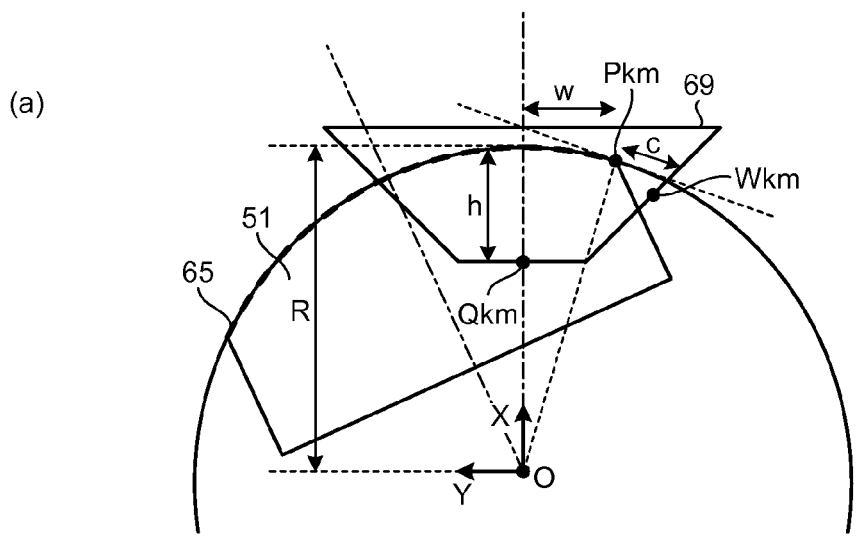
FIG. 18 is an explanatory diagram of a calculating method for a tool distal end height according to the present embodiment.
Figure 18:
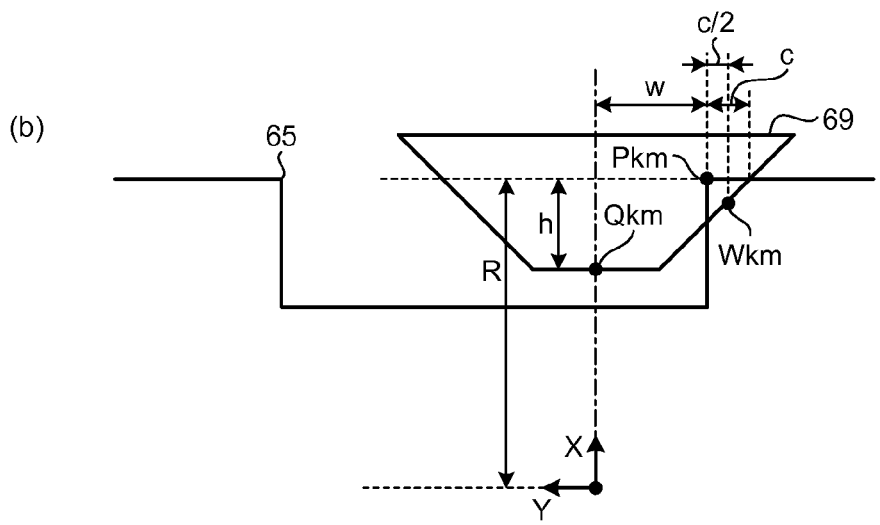
Figure 18:
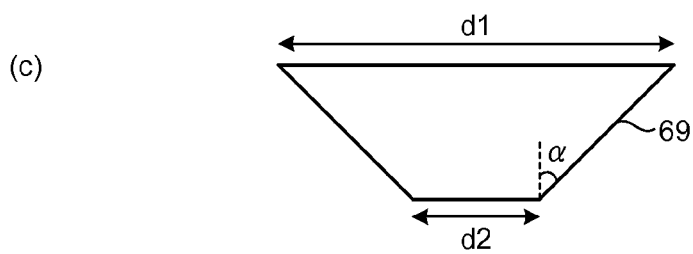

A specific example of a calculation is illustrated below. FIG. 17 is an explanatory diagram of a calculating method for a tool distal end point position according to the present embodiment. FIG. 18 is an explanatory diagram of a calculating method for a tool distal end height according to the present embodiment. As illustrated in FIG. 17(a), similarly to the calculation method for a reference vector in generating of a reference point described in Patent Literature 1, a tangent vector Tkm (a unit vector) is calculated by the cross product of normal vectors of a second machining surface and a first machining surface adjacent to an edge Ek to which a reference point Pkm belongs among edges constituting the edge shape 65 of the chamfered part 51.

An origin O of an XYZ coordinate is set on the central axis 63 of a shaped raw material, and an origin of ZS coordinate is also set on a tangent plane Fkm. Note that these origins are set so that the z axis direction of the XYZ coordinate matches that of the ZS coordinate and the point where Z=0. Assuming that $$Pkm(x,y,z) = (px,py,pz),$$

$$Tkm(x,y,z) = (tx,ty,tz),$$

$$Tkm(z,s) = (dz,ds), \text{ and}$$

R: radius of shaped raw material, and
when z0 and s0 denote direction vectors (unit vectors) of the Z axis and the S axis, respectively, $$s0 = (-py/R, px/R, 0.0) \text{ and}$$

$$z0 = (0.0, 0.0, 1.0).$$

Therefore, $$dz = vz \text{ and}$$

$$ds = (px \cdot ty - py \cdot tx)/R.$$

Tkm⊥Nkm is satisfied, and thus $$Nkm(z,s) = (-ds, dz)$$

is obtained.

When ZS coordinate system defined for calculations is converted into a ZC coordinate system that is the coordinate system of a linear axis (a distance) and a rotating axis (an angle), the offset vector Nkm and the reference point Pkm are expressed by the following expressions (2) and (3), respectively.

$$Nkm(z,c) = (-ds, dz/R) \quad (2)$$

$$Pkm(z,c) = (pz, a\sin(py/R)) \quad (3)$$

Next, the offset amount w and the height of the tool reference position Qkm are obtained. FIG. 18(a) illustrates that a chamfering tool 69 performs chamfering on the edge shape 65 of the chamfered part 51 on a cylindrical surface by a chamfering amount of c. A point Wkm is basically a point through which the center of the cutting length of the chamfering tool 69 passes and is also the center of the chamfering width.

FIG. 18(b) is a simplified schematic diagram illustrating the state illustrated in FIG. 18(a); and it is assumed that the angle between machining surfaces adjacent to the edge shape 65 is fixed (a right angle). FIG. 18(c) is an explanatory diagram illustrating the chamfering tool 69 used in the present embodiment, of which the tool has a small diameter of d2, a large diameter of d1, and a half included angle of α.

In the present embodiment, the offset amount w and the height of the tool reference position Qkm are calculated by approximate calculations illustrated in FIG. 18(b). As illustrated in FIG. 18, the offset amount w and a length h of a vertical line from the tool reference position Qkm to a cylindrical surface are calculated by using the following expressions (4) and (5).

$$w = 0.25 \cdot (d1 + d2) - 0.5 \cdot c \quad (4)$$

$$h = 0.25 \cdot (d1 - d2)/\tan \alpha + 0.5 \cdot c \quad (5)$$

The tool reference position Qkm can be obtained by substituting the expressions (2) to (4) into the expression (1). The height of the tool reference position Qkm (z, c) can be represented by the following expression (6) by using the expression (5). As a result, the tool reference position Qkm (z, c) can be calculated uniquely.

$$R - h = R0.25 - (d1 - d2)/\tan \alpha + 0.5 - c \quad (6)$$

Note that the result of chamfering using a machining path calculated by the approximate calculation used in the present embodiment is that the chamfering width is not always fixed. In most cases, however, it is adequate only for the chamfered corners to become rounded for the improvement of safety, and higher accuracy is not required if it falls within a certain acceptable range. Accordingly, the method used in the present embodiment is effective and also contributes to reduced calculation loads.

In the present embodiment, the tool reference position Qkm is calculated while the offset amount w and the height h of the tool reference position Qkm obtained by the respective expressions (4) and (5) are set and fixed. By controlling the values of w and h, however, it is also possible to generate a chamfering path along which chamfering widths become more uniform.

As described above, after the tool reference position Qkm in which the reference point Pkm is the reference has been generated, the process returns to FIG. 10, m=m+1 is set (Step S333), and the process returns to Step S332. During the period when m is smaller than M (YES at Step S332), the process at Step S341 is performed. That is, the tool reference position Qkm is calculated for all the reference points Pkm of the extracted edge Ek.

When m is equal to or larger than M (NO at Step S332), k=k+1 is set (Step S313), and the process returns to Step S312. When k+1 is smaller than N at Step S312, for the next edge Ek+1, the process of generating a reference point sequence and the process of generating a tool reference position for each reference point are performed. When k<N is not satisfied at Step S312 (NO at Step S312), generation of a chamfering tool path stops, and the process returns to Step S217 of the flowchart illustrated in FIG. 2.

In the present embodiment, when chamfering is performed on a boundary of the shaped raw material and a machining area shape defined on a surface of a shaped raw material that has a curved surface shape, a machining path for realizing chamfering by 2-axis machining is generated, of which the axes are a rotating axis parallel to a central axis of the shaped raw material and a linear axis parallel to a bottom surface of the machining area shape. Accordingly, when chamfering a curved surface, even when t-axis machining with the rotating axis and the linear axis is performed, it is possible to effectively perform chamfering with a substantially uniform chamfering width. When obtaining the coordinates of a reference point Pkm, a machining target part shape obtained by projecting a bottom surface shape constituted by a plane of a machining part onto a material surface constituted by a curved surface is used. Therefore, it is possible to obtain a machining target part shape relatively easily as compared to calculations necessary for generating an intersection portion of shapes including curved surfaces.

INDUSTRIAL APPLICABILITY

As described above, the automatic programming device according to the present invention is useful for performing chamfering on a curved surface by utilizing two axes: a rotating axis and a linear axis.

REFERENCE SIGNS LIST 1 material-shape data input unit, 2 machining-area data input unit, 3 machining-program storage unit, 4 machined-material-shape generation unit, 5 related-machining-area data extraction unit, 6 machining-program analyzing unit, 7 tool-path generation unit, 8 machining-area-shape generation unit, 9 chamfering tool-path generation unit, 10 control-command generation unit, 21 chamfered-surface defining unit, 22 reference-point-sequence generation unit, 23 tool-reference-position generation unit.

The invention claimed is:

1. An automatic programming device that generates control-command data on the basis of machining-area data for partial machining of a shaped raw material, the automatic programming device comprising:
  a machining-area-shape generation unit that generates machining-area shape data that corresponds to a machining area shape machined on the basis of the machining-area data; and
  a chamfering tool-path generation unit that, when the machining area shape is a chamfering target part, generates chamfering tool-path data for chamfering according to chamfering data including the machining-area shape data, tool-to-be-used data, and machining condition data, wherein
  the chamfering tool-path generation unit includes
    a chamfered-surface defining unit that, when performing chamfering on a boundary of the machining-area shape defined on a curved surface that is the shaped raw material and the shaped raw material, generates chamfered surface shape data that defines a chamfered surface after the chamfering for a shape of the chamfering target part on the basis of the machining-area shape data and the machining condition data that are stored in advance,
    a reference-point-sequence generation unit that generates a reference point sequence serving as a reference for generating the chamfering tool-path data on the basis of the chamfering data, and
    a tool-reference-position generation unit that generates a reference position of the chamfering tool when the chamfering tool passes while performing chamfering by using 2-axis machining with a rotating axis parallel to a central axis of the shaped raw material and with a linear axis parallel to a bottom surface of the machining area shape for each reference point of the reference point sequence and the chamfered surface.

2. The automatic programming device according to claim 1, wherein
  the machining area shape is an area shape constituted by a shape element including a curved line that cannot be defined on a plane,
  the automatic programming device further comprises a plane shape defining unit that defines a shape on an arbitrary plane, and
    a curved-surface shape defining unit that defines a shape on a space, and the reference-point-sequence generation unit
    sets an intersection line obtained by projecting plane shape defined by the plane shape defining unit onto curved surface shape defined by the curved-surface shape defining unit as a machining target part shape, and
    generates the reference point sequence by using the machining target part shape.

3. The automatic programming device according to claim 1, wherein
  the machining area shape is a groove or a hole defined on a surface of the shaped raw material.

4. The automatic programming device according to claim 1, wherein
  the shaped raw material has a cylindrical shape,
  the rotating axis is parallel to a line connecting centers of two bottom surfaces of the cylindrical shape, and the linear axis is parallel to the plane shape of the chamfering target part defined by the plane shape defining unit.

5. An automatic programming method for generating control-command data on the basis of machining-area data for partial machining of a shaped raw material, the automatic programming method comprising:

a machining-area-shape generating of generating machining-area shape data that is a machining area shape machined on the basis of the machining-area data; and a chamfering tool-path generating of, when the machining area shape is a chamfering target part, generating chamfering tool-path data, for chamfering on the basis of chamfering data including the machining-area shape data, tool-to-be-used data, and machining condition data, wherein the chamfering tool-path generating includes a chamfered-surface defining of, when performing chamfering on a boundary of the machining area shape defined on a curved surface that is the shaped raw material and the shaped raw material, generating chamfered surface shape data that defines a chamfered surface after the chamfering for a shape of the chamfering target part on the basis of the machining-area shape data and the machining condition data that are stored in advance, a reference-point-sequence generating of generating a reference point sequence serving as a reference for generating the chamfering tool-path data on the basis of the chamfering data, and a tool-reference-position generating of generating a reference position of the chamfering tool when the chamfering tool passes while performing chamfering by using 2-axis machining with a rotating axis parallel to a central axis of the shaped raw material and with a linear axis parallel to a bottom surface of the machining area shape for each reference point of the reference point sequence and the chamfered surface.

* * * * *